United States Patent
Carreau (10) Patent No.: US 10,834,806 B2
(45) Date of Patent: Nov. 10, 2020

(54) AUTOMATIC EXPOSURE DETECTION CIRCUIT FOR IMAGING APPLICATIONS

(71) Applicant: Analog Devices, Inc., Norwood, MA (US)

(72) Inventor: Gary R. Carreau, Plaistow, NH (US)

(73) Assignee: ANALOG DEVICES, INC., Norwood, MA (US)

( * ) Notice: Subject to any disclaimer, the term of this patent is extended or adjusted under 35 U.S.C. 154(b) by 125 days.

(21) Appl. No.: 15/993,987

(22) Filed: May 31, 2018

(65) Prior Publication Data

US 2018/0352639 A1   Dec. 6, 2018

Related U.S. Application Data

(60) Provisional application No. 62/512,796, filed on May 31, 2017.

(51) Int. Cl.
| H05G 1/38 | (2006.01) |
| H05G 1/10 | (2006.01) |
| H04N 5/32 | (2006.01) |

(52) U.S. Cl.
CPC .............. *H05G 1/38* (2013.01); *H04N 5/32* (2013.01); *H05G 1/10* (2013.01)

(58) Field of Classification Search
CPC .............. H05G 1/38; H05G 1/10; H04N 5/32
See application file for complete search history.

(56) References Cited

U.S. PATENT DOCUMENTS

| 5,887,049 A | 3/1999 | Fossum |
| 7,211,803 B1 | 5/2007 | Dhurjaty et al. |
| 9,304,210 B2 | 4/2016 | Yoon et al. |
| 9,547,092 B2 | 1/2017 | Kim et al. |
| 9,658,347 B2 | 5/2017 | Jacob et al. |
| 2006/0169907 A1 | 8/2006 | Shinden |
| 2007/0104311 A1 | 5/2007 | Possin et al. |
| 2013/0032696 A1 | 2/2013 | Tajima |
| 2014/0064454 A1* | 3/2014 | Hammond ............. A61B 6/566 378/96 |
| 2016/0373672 A1 | 12/2016 | Liu |
| 2017/0005131 A1 | 1/2017 | Jung et al. |

FOREIGN PATENT DOCUMENTS

| EP | 2749904 | 7/2014 |
| KR | 101420250 | 6/2014 |
| KR | 2016/0048538 | 5/2016 |
| KR | 101697263 | 1/2017 |
| WO | 2017006513 | 1/2017 |
| WO | 2017/028893 | 2/2017 |
| WO | 2017/121728 | 7/2017 |

OTHER PUBLICATIONS

International Search Report and Written Opinion issued in PCT Application Serial No. PCT/2018/053526 dated Sep. 13, 2018, 12 pages.

* cited by examiner

*Primary Examiner* — Courtney D Thomas
(74) *Attorney, Agent, or Firm* — Patent Capital Group (57) ABSTRACT

Systems and methods are provided for an automatic exposure detection feature for adding to an x-ray panel readout device, including an imaging panel having a low power mode, a sense circuit for receiving an input signal in the low power mode and restricting an input signal voltage to a first voltage, and a sensor for sensing a change in the input signal voltage, wherein the change in input signal voltage indicates exposure to an x-ray signal.

18 Claims, 8 Drawing Sheets

AUTOMATIC EXPOSURE DETECTION CIRCUIT FOR IMAGING APPLICATIONS

CROSS REFERENCE TO RELATED APPLICATIONS

This Application claims priority to U.S. Patent Application Ser. No. 62/512,796 filed May 31, 2017, which Application is considered incorporated by reference into the disclosure of this Application.

TECHNICAL FIELD OF THE DISCLOSURE

The present invention relates to the field of imaging and automatic exposure detection.

BACKGROUND

Current x-ray systems generally use digital radiography in which digital x-ray sensors are used instead of traditional photographic film. Some advantages of digital imaging include efficiency as well as the digital storage of images and digital image enhancement techniques. Other advantages include the immediacy of image availability, the elimination of image processing steps, and a wider dynamic range. Additionally, digital x-ray systems generally use less radiation than conventional photographic film x-ray systems. Instead of film, digital imaging uses a digital image capture device.

Digital radiography systems generally include an imaging panel for detecting an image, such as a flat panel detector. There are many different types of detectors, including indirect flat panel detectors, direct flat panel detectors, CMOS detectors, charge coupled device (CCD) detectors and phosphor plate radiography detectors.

X-ray systems often include a circuit for sensing the arrival of an x-ray signal at a wireless digital x-ray panel. To optimize battery life, some systems create a separate sensing path, independent of the panel readout path, but this requires additional area and components while also increasing the weight of the panel. Other systems use the main readout electronics, which substantially increases the power usage of the system.

SUMMARY OF THE DISCLOSURE

Systems and methods for sensing the arrival of an x-ray signal in a wireless digital x-ray panel are disclosed. In particular, according to some implementations, a method for automatic exposure detection in imaging applications includes entering a low power state at an imaging panel, restricting an input signal voltage to a first voltage at a sense circuit in the imaging panel, receiving an input signal at the sense circuit in the imaging panel, sensing a change in the input signal voltage, wherein the change in the input signal voltage indicates exposure to an x-ray signal, and exiting the low power state based on the change in the input signal voltage.

In some examples, restricting the input signal voltage comprises clamping the input signal voltage. In some examples, restricting the input signal voltage comprises clamping the input signal voltage at a diode. In some examples clamping the input signal voltage comprises clamping the input signal voltage at a charge amplifier. In one example, the charge amplifier is optimized for x-ray sensing.

In some implementations, a change in the input signal voltage is sensed using a converter. In some implementations, the imaging panel includes a readout integrated circuit (ROIC) having a signal chain, and entering the low power state includes reusing at least a part of the signal chain for the sense circuit. In some examples, the ROIC includes an integrator, and entering the low power state comprises powering down the integrator. In some implementations, reusing at least a part of the signal chain includes reusing a clamp element of the signal chain, and entering the low power state includes powering down other elements of the signal chain. In some implementations, sensing a change in the input signal voltage includes sensing a change using a converter.

According to some implementations, a system for automatic exposure detection in imaging applications includes an imaging panel including a low power mode, a sense circuit for receiving an input signal in the low power mode and restricting an input signal voltage to a first voltage, and a converter for sensing a change in the input signal voltage, wherein the change in input signal voltage indicates exposure to an x-ray signal. In some examples, the sense circuit includes a diode for clamping the input signal voltage. In some examples the sense circuit includes a charge amplifier for clamping the input signal voltage. In some examples, the sensor is a converter. In some implementations, the sense circuit is an electrostatic discharge circuit.

In some implementations, the system for automatic exposure detection further includes a readout integrated circuit (ROIC) having a signal path, and in the low power mode, the sense circuit uses at least a part of the signal path. In some examples, the part of the signal path the sense circuit uses includes a clamp. In some implementations, the ROIC includes an integrator, and the integrator is powered down in the low power mode.

According to some implementations, a system for automatic exposure detection in imaging applications comprises an imaging panel including a low power mode, a sense circuit for restricting an input signal voltage to a first voltage and for receiving an input signal in the low power mode, and means for sensing a change in the input signal voltage. The change in input signal voltage indicates exposure to an x-ray signal.

In some implementations, the means for sensing includes a converter. In some implementations, the sense circuit is an electrostatic discharge circuit. In some implementations, the sense circuit includes a diode for clamping the input signal voltage. In some examples, the sense circuit includes a charge amplifier for clamping the input signal voltage.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts in which.

DESCRIPTION OF EXAMPLE EMBODIMENTS OF THE DISCLOSURE

X-ray systems include a circuit for sensing the arrival of an x-ray signal at a wireless digital x-ray panel. However, current methods for sensing x-ray signal arrival use additional area and components, or substantially increase the power usage of the system. For example, some systems create a separate independent channel optimized for x-ray detection, for the sensing path, which senses x-rays while the entire readout signal path is powered down. This type of system is power efficient but requires additional components in the design which increases the cost and weight of the panel. Other systems reuse the main readout signal path, either in a low power state or using a subset of channels while powering down others. This simplifies board design and does not increase weight, but significantly increases the power usage of the system, directly affecting battery life. Systems and methods are disclosed for sensing the arrival of an x-ray signal in a wireless digital x-ray panel without adding cost, area, weight, or increasing power usage.

Imaging readout integrated circuits (ROIC's) are used to convert the charge from an imaging sensor into a high precision digital value. In some examples, the charge is a current. The performance of the conversion from analog to digital determines the quality of the image. Quality can be improved by optimizing the noise, linearity, speed, and power used for the conversion function. In some implementations, the signal chain for the ROIC includes a low noise charge amplifier circuit, a correlated double sampler, and a high-resolution ADC. In many x-ray applications, the ROIC panel is wireless and independent of the x-ray source. In order to save battery life, the ROIC panel stays in a lower power state until an x-ray is sensed.

In some systems, for a low power x-ray sensing mode, readout integrated circuits (ROIC's) are software reconfigured to a different low power state. In the low-power state, the ROIC does not operate at full performance, but some functionality is still maintained in order to detect the arrival of an x-ray signal. In some systems, for a low power mode, many ROIC's are powered down to conserve energy, while others remain powered on to detect x-ray signals. Powering down some ROIC's while leaving other ROIC's on reduces overall power consumption. However, the problem with these systems is that the system design is constrained by the features of the ROIC and the time required to stabilize the performance of the system on wake-up. Additionally, the ROIC's that remain on still consume a lot of power, and thus the system consumes more power than necessary for x-ray detection.

Systems and methods are provided for an automatic exposure detection feature for adding to an x-ray panel readout device. Readout ICs (ROIC's) are used to convert the charge on pixels within an x-ray panel to digital values in order to create a visible image. The accuracy and precision of these circuits correlates with the quality of the image. Many applications use an Automatic Exposure Detection (AED) circuit which can remain in a low power state until the x-ray signal is detected. When the x-ray signal is detected, the AED circuit powers up the imaging panel and captures the image. After imaging is completed, the AED circuit returns to a low power state.

Systems and methods are provided for re-using one or more of the high performance ROIC components in an x-ray sensing function. The x-ray sensing function is optimized for x-ray detection and uses about 95-98% less power than the ROIC function. The systems and methods for re-using the high performance ROIC components have no significant impact to the circuit design or to circuit area. Additionally, the systems and methods for re-using the high performance ROIC components do not affect performance during the main imaging function. As described in greater detail below, in some implementations, the clamp element of an a ROIC can be used for x-ray sensing while other elements of the ROIC are powered down. In one example, the clamp element is a diode.

According to various implementations, the high performance imaging signal chain is re-used for a much lower power, lower resolution signal chain which is re-optimized for x-ray detection. Re-using the imaging signal chain for a lower power, lower resolution signal chain allows for a low power x-ray sensing mode without impacting the chip area or performance during normal (imaging) operation.

According to one implementation, the high performance blocks of the ROIC signal chain are replaced with lower performance blocks optimized for x-ray detection. According to other implementations, selected elements of the ROIC signal chain are used for x-ray detection while the remaining elements enter a low-power state or are powered down.

An x-ray sensing signal path is designed to be added to an x-ray panel, allowing the panel to easily enter into and exit from a low power standby mode. In the low-power standby mode, the x-ray signal can still be detected. When an x-ray signal is detected in low-power stand-by mode, the system switches to imaging mode and the high-performance ROIC imaging system is powered on. The x-ray panel including the x-ray sensing signal path includes circuits and techniques which can dramatically lower the power of the x-ray sensing function by about 95-98% as compared to previous approaches.

Figure 1:
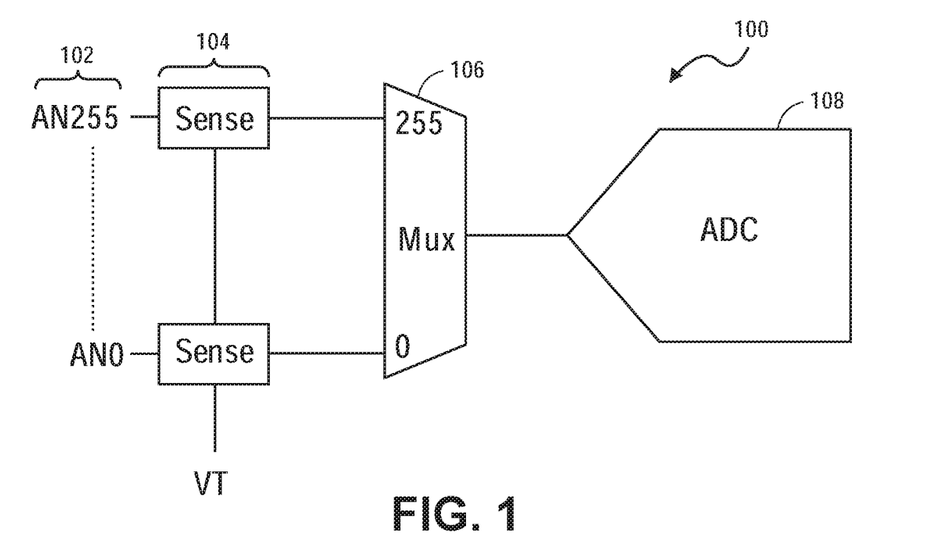
FIG. 1 is a diagram illustrating the x-ray sensing signal path, according to some embodiments of the disclosure.

FIG. 1 is a diagram illustrating an x-ray sensing signal path 100, which can be used to detect x-ray signals in a low power mode, according to some embodiments of the disclosure. The x-ray sensing signal path 100 includes input lines 102, sensors 104, a multiplexor 106, and an analog-to-digital converter 108. The input lines 102 are analog input lines. According to one implementation, x-ray signals directed to an x-ray panel are received at the input lines 102. According to various examples, the x-ray sensing signal path 100 includes multiple sensors 104, and may include a sensor 104 for each input line 102. The output from the sensors 104 is input to the multiplexor 106, and the output from the multiplexor 106 is input to the analog-to-digital converter 108. In one example, 256 analog inputs are received at the input lines 102, and input to 256 sensors 104, and the output from the 256 sensors 104 is input to the multiplexor 106. In some examples, the x-ray sensing signal path 100 is driven to a voltage controlled by the VT input, a selected input voltage. The x-ray sensing signal path 100 power scales with line time.

The readout requirements for x-ray detection can be very different from imaging since readout time, noise and dynamic range are less important, while power savings and recovery time are more important. The x-ray sensing signal path 100 takes advantage of these differences in order to optimize performance in both readout and detection modes, while not sacrificing the performance requirements of the readout process. According to various implementations, ROIC design changes are made to optimize Automatic Exposure Detection (AED) performance. In one example, an ROIC design change for low power x-ray detection mode includes fully powering down the charge integrators, thereby greatly reducing system power. In one example, an ROIC design change for low power x-ray detection mode includes power-scaling the ADC and amplifiers to dynamically reduce the power dissipation. In another example, an ROIC design change for low power x-ray detection mode includes minimizing the power used for system reference biasing, thus reducing turn-on time once the x-ray is detected. A digital output interface can be used for maximum power savings. In one example, the digital output interface is a CMOS Input/Output (I/O).

In x-ray sensing mode, the x-ray sensing signal path 100 uses a very low power sense circuit which does not bias the panel to a thin film transistor reference voltage (REF_TFT). In contrast, in imaging mode, the panel is biased to REF_TFT. Instead, in x-ray sensing mode, the panel is driven to a voltage controlled by the VT input (or an optional VDD/2 voltage). The VT input voltage clamps the input to VT+/-$V_{BE}$, where $V_{BE}$ is base-emitter voltage. As a result, in x-ray sensing mode, the final panel voltage is a function of the leakage current on each channel. In x-ray sensing mode, the input bias current is on the order of several hundred picoamperes (pA). Thus, with no additional input load, the input bias current causes the input to be driven to VT-$V_{BE}$. Since the input leakage can vary greatly, each channel in x-ray sensing mode can settle to a different output code. In one example, REF_TFT is one volt.

Figure 2:
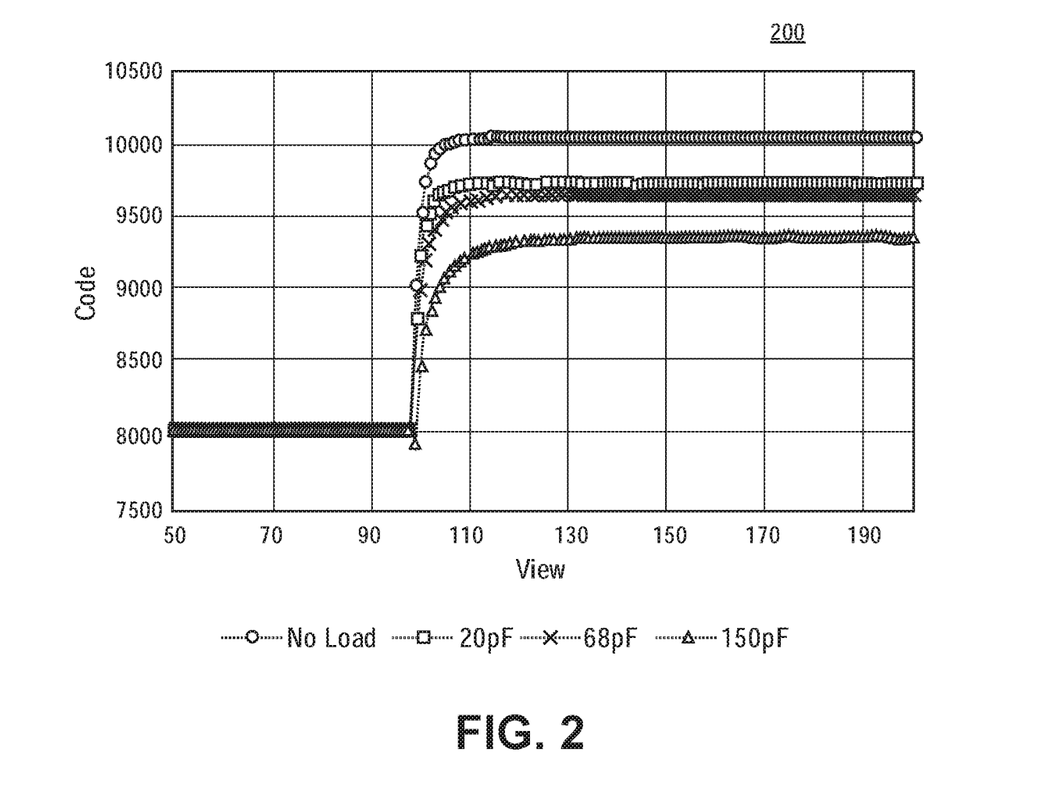
FIG. 2 is a graph illustrating a read out integrated circuit output switching from imaging mode to x-ray sensing mode, according to some embodiments of the disclosure.

FIG. 2 is a graph 200 illustrating various channels of the ROIC output switching from imaging mode to x-ray sensing mode at different input leakages over time (over a number of views shown on the x-axis), according to some embodiments of the disclosure. In particular, in x-ray sensing mode, each channel settles to a different output code depending on the input leakage. As shown in FIG. 2, with no additional input load, the input bias current causes the input to be driven to VT-$V_{BE}$, and when the ROIC output is switched from imaging mode to x-ray sensing mode, the channel with no input load settles at code 10000. Similarly, at a load of 20 pF (picoFarads), when the ROIC output is switched from imaging mode to x-ray sensing mode, the channel with a 20 pF input load settles around code 9700. At a load of 68 pF, when the ROIC output is switched from imaging mode to x-ray sensing mode, the channel with a 68 pF load settles around code 9600. At a load of 150 pF, when the ROIC output is switched from imaging mode to x-ray sensing mode, the channel with a 150 pF load settles around code 9400. In selecting the voltage for VT, the voltage is within the input range of the ADC [0.5v to 4.5v]. Additionally, the voltage VT is equal to or less than the absolute maximum values specified in the datasheet.

According to some implementations, there are two steps to enter the x-ray sensing AED mode. First, the desired mode is selected in the configuration register. This is programmed once on power-up since it is a configuration. The second step to enter x-ray sensing mode is a small digital pattern which is used to begin and end the x-ray sensing mode. Once the proper digital pattern is provided to enter x-ray sensing, the part reconfigures itself and operates with standard or modified system timing. In some examples, the part that reconfigures itself is the ROIC. In some implementations, the selected readout timing is reused for x-ray sensing, but at a much lower frequency.

Due to the wide variety of panel characteristics and the sensitivity of x-ray sensing, the implementation of the system can be tuned for each application. As discussed above, FIG. 2 shows the offset of the x-ray panel entering x-ray sensing mode. In this example, REF_TFT is 1V, which, in imaging mode, results in an output offset of ~8000 lsbs for normal readout conditions. At view 100 (on the x-axis), the device is switched from imaging mode into x-ray sensing mode and due to internal leakages (~100 pA) the inputs begin to decay towards VT-0.5v. According to one example, VT=1.5v. As shown in FIG. 2, switching into x-ray sensing mode stabilizes after 10-20 views, depending on the input loading. In one example, the x-ray is strong enough to bring the signal above 0.5V and into the range of the ADC.

The various channels of the x-ray panel can be monitored for the x-ray detection. In some examples, as few as one channel is monitored within one ROIC, and in other examples, monitoring occurs across all channels within the panel. In one implementation, one x-ray panel is used for x-ray sensing, and the remaining devices are fully powered down for further power savings. Using fewer than 256 channels within one x-ray panel will not yield significantly increased power savings for the x-ray panel, but using fewer than 256 channels within one x-ray panel saves computational power in the system processing. In one implementation, the results of all of the channels being monitored are averaged to reduce noise.

In some implementations, x-ray sensing systems use a voltage VT=2.5v. In one example, the x-ray source is emulated using a current pulse, and the current pulses are stepped from near 0, increasing in ~200 nA steps in one pixel. In one example, to maximize sensitivity to the x-ray pulse, the gate drivers remain on during the entire x-ray sensing operation. Binning many pixels together is can improve sensitivity. According to various implementations, different pixels can be selected for binning together for optimal detection. Any number of pixels can be binned, for example 10's of pixels can be binned, 100's of pixels can be binned, and 1000's of pixels are binned. In some examples, columns of pixels are binned. In other examples, rows of pixels can be binned. Sensitivity increases with more pixels binned, at a slight reduction in settling time when switching modes due to the increased input load capacitance (see FIG. 2). Increased noise due to the input loading is not significant for x-ray sensing mode due to the fairly low resolution requirement for x-ray detection. The inputs do not need to settle completely when entering x-ray sensing mode, as long as the x-ray signal is larger than the noise and settling error, the x-ray signal is easily detected.

According to some implementations, switching modes from x-ray sensing mode to imaging mode results in selected output characteristics. Depending on application specific details, there can be additional thermal settling when switching to imaging mode due to the increase in power dissipation and self-heating of the x-ray panel. Thus, when switching from x-ray sensing mode to imaging mode, it may take a few views before the output is normalized.

One advantage of the x-ray sensing systems and methods discussed herein is the power savings. The system architecture is designed to minimize power dissipation while maintaining features such as proper panel bias, resolution, and fast wake-up time during AED. In some implementations, the system uses an LVDS (Low Voltage Differential Signaling) interface. In other implementations, the system uses a CMOS I/O interface. In addition to the static power, there is a dynamic power dissipation which is a function of line time, and mostly independent of the type of I/O used. The slower the line time, the less total power dissipation. In some examples, the line time in x-ray sensing mode is much slower than typical readout times, and is around 1 kHz or less.

Figure 3:
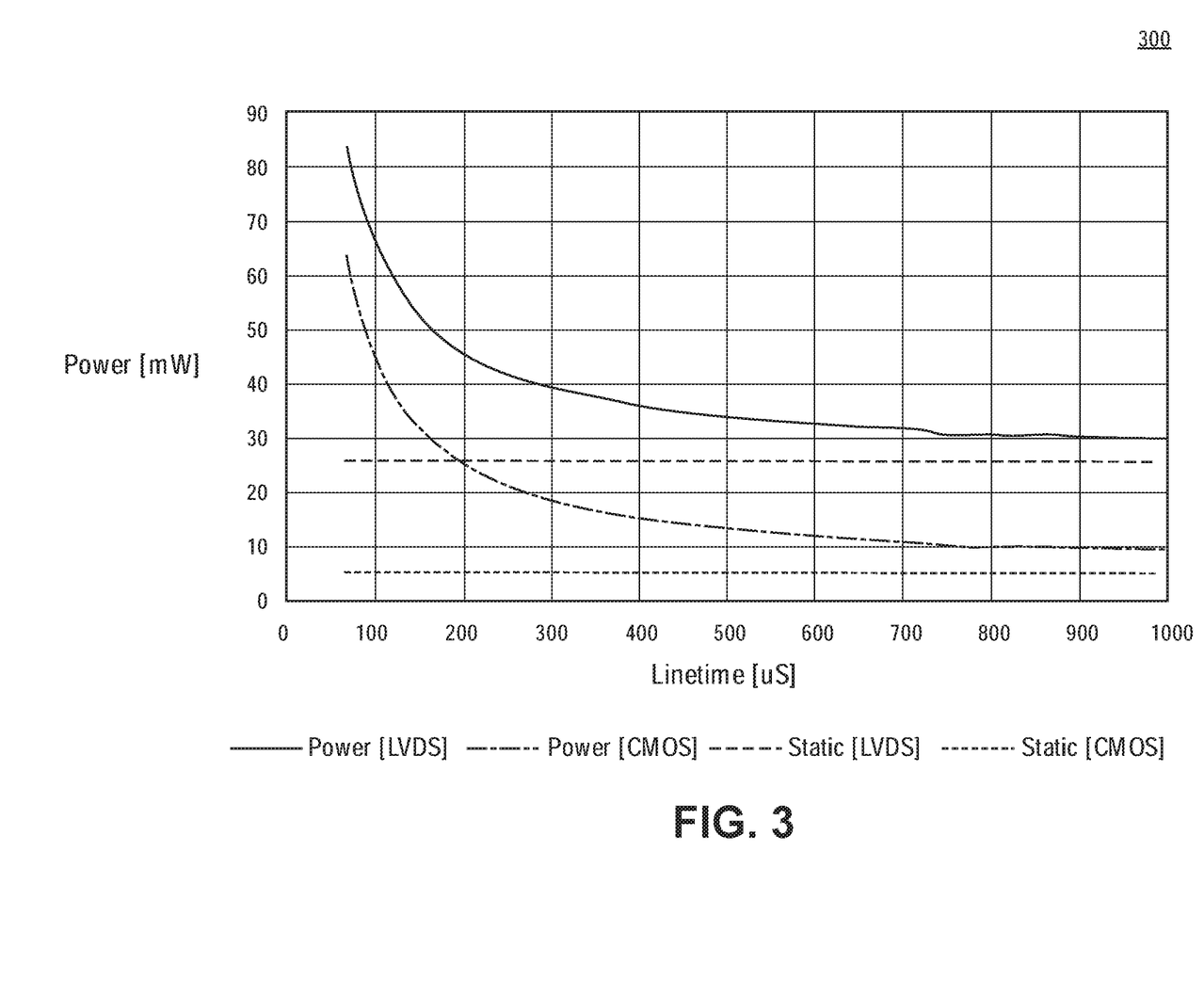
FIG. 3 is a graph illustrating total x-ray sensing power versus line time, according to some embodiments of the disclosure.

FIG. 3 is a graph 300 illustrating total x-ray sensing power versus line time, according to some embodiments of the disclosure. In particular, the graph 300 of FIG. 3 shows the dynamic effect of the total power dissipation.

Figure 4:
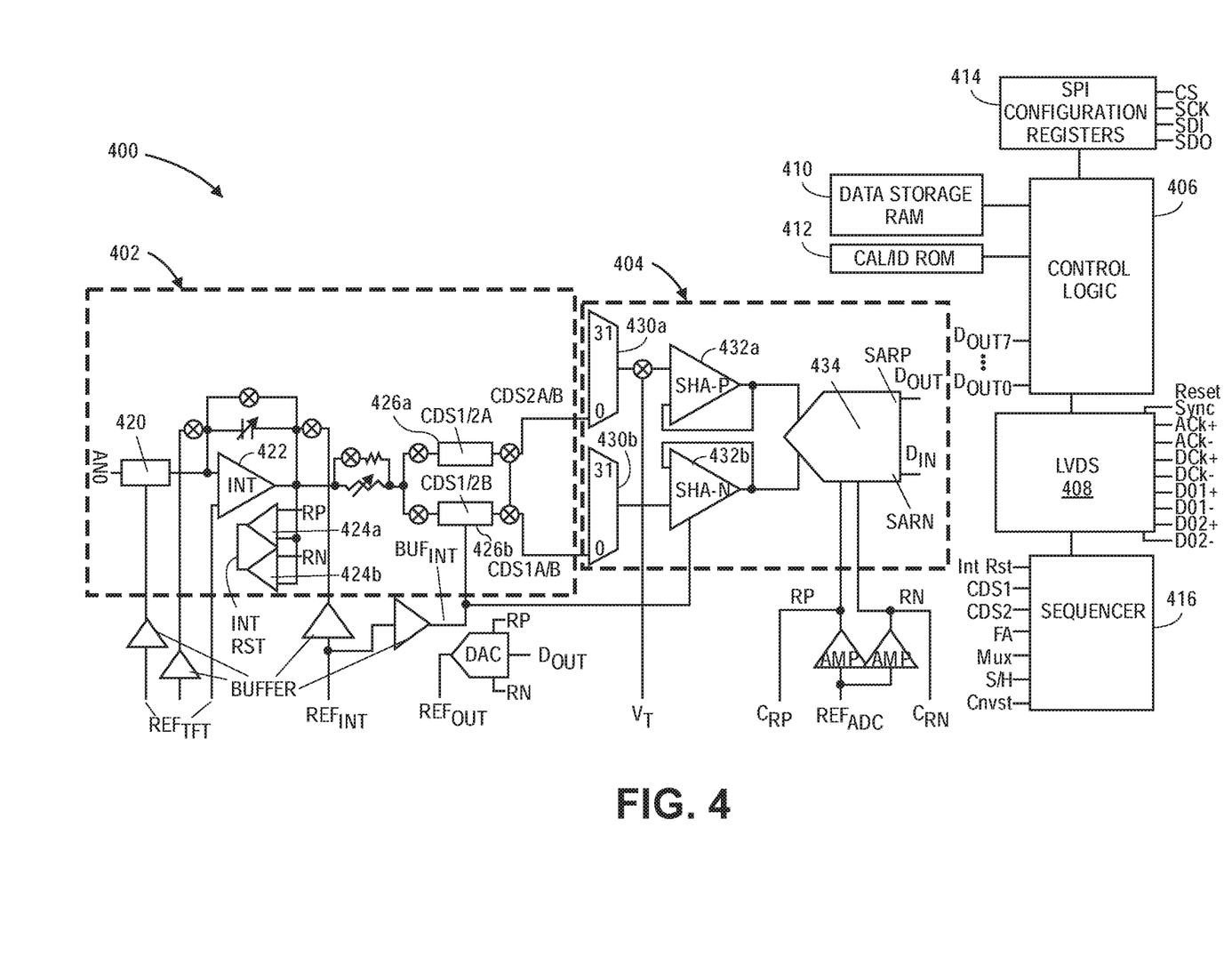
FIG. 4 is a graph illustrating an x-ray signal path.

FIG. 4 is a diagram illustrating an x-ray signal chain 400, including a first circuit module 402, a second circuit module 404, control logic 406, a low-voltage differential signaling module (LVDS) 408, random access memory (RAM) 410, read only memory (ROM) 412, registers 414, and a sequencer 416. The first circuit module 402 includes a clamp 420, an integrator 422, comparators 424a, 424b, and CDS elements 426a, 426b. The first circuit module 402 receives an input signal at the clamp 420. In some examples, the clamp 420 is a clamp diode. The input signal is an analog input signal received at the clamp. In some examples, the input signal is an x-ray signal. As shown in FIG. 4, the input signal is AND. The clamp 420 outputs a signal to the integrator 422. In some examples, the integrator 422 also receives a reference input REF_TFT. The integrator 422 integrates the input signal(s) over time to yield an output signal. The output from the integrator 422 is input to the comparators 424a, 424b. The output from the integrator 422 is input to the CDS elements 426a, 426b. In some examples, the integrator 422 is an amplifier/integrator. In one implementation, the CDS elements 426a, 426b reduce the noise of the signal. The second circuit module 404 includes multiplexors 430a, 430b, sample-and-hold amplifiers 432a, 432b, and an ADC 434.

According to one implementation, an x-ray signal chain 400 includes multiple first circuit modules 402 and multiple second circuit modules 404. In some implementations, multiple first circuit modules 402 are input to one second circuit module 404. In particular, output from multiple first circuit modules 402 are input into multiplexors 430a, 430b in the second circuit module 404. In one example, an x-ray signal chain 400 includes 256 first circuit modules 402 and eight second circuit modules 404, and 32 first circuit modules 402 are input to each second circuit module 404 at the multiplexors 430a, 430b.

According to various examples, and as measured in various x-ray panels, the integrator consumes a large amount of the power in conventional x-ray panels. In conventional systems having a low power x-ray sensing mode, the integrator typically remains powered on in low power x-ray sensing mode to keep the voltage on the panel constant. The panel voltage is used for sensing x-rays in the x-ray systems. According to some embodiments of the disclosure, in low power x-ray sensing mode, the integrator is powered down.

In particular, the x-ray panel with the x-ray sensing system described herein powers down the low-noise high-accuracy integrator 422. In some implementations, the x-ray sensing system functions without an integrator. In other implementations, the x-ray sensing system includes a low-power integrator for use in x-ray sensing mode.

In some implementations, in x-ray sensing mode, the clamp 420 is used to drive the input for electrostatic discharge (ESD) events. The input voltage is maintained at a fairly constant level, and a converter is used to sense a change in the voltage indicating the presence of an x-ray. This enables the rest of the chip, including the integrator 422, the comparators 424a, 424b, the CDS elements 426a, 426b, the multiplexors 430a, 430b, the sample-and-hold amplifiers 432a, 432b, and the ADC 434, to enter a low-power state, increasing efficiency of the x-ray panel.

Figure 5:
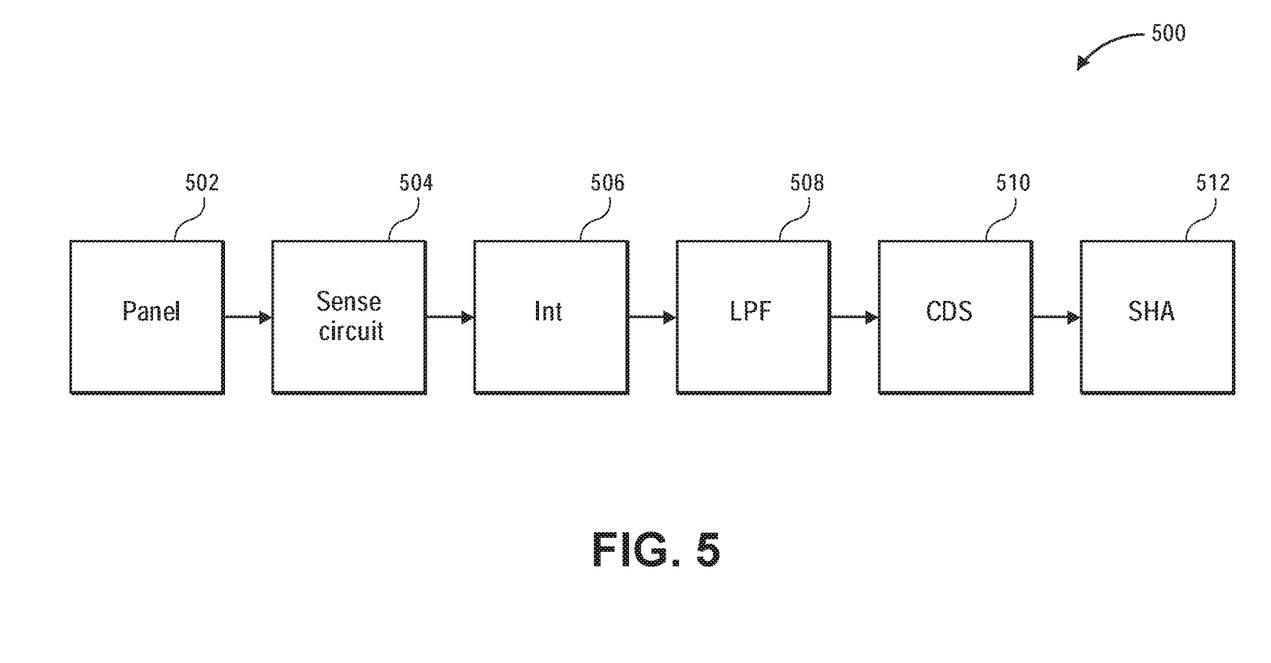
FIG. 5 is a block diagram illustrating an x-ray sensing signal path, according to some embodiments of the disclosure.

FIG. 5 is a block diagram illustrating an x-ray sensing signal path 500, according to some embodiments of the disclosure. The x-ray sensing signal path includes a panel 502, a sense circuit 504 an integrator 506, a LPF (low pass filter) 508, a CDS (correlated double sampler) 510, and a sample and hold amplifier (SHA) 512. In some implementations, the panel 502 is an x-ray panel and has about 1,000 pixels enabled per line. Input received at the panel 502 is output to the sense circuit 504. In some examples, the sense circuit is an ESD (electrostatic discharge) circuit. The output from the sense circuit 504 is input to the integrator 506. In some implementations, the integrator 506 includes a reset switch. Output from the integrator 506 is input to the LPF 508. The low pass filtered signal output from the LPF 508 is input to the CDS 510. The CDS 510 reduces noise in the signal and outputs an output signal to the SHA 512. In some implementations, in low power (x-ray sensing) mode, the panel 502 and sense circuit 504 are powered on, and the integrator 506, LPF 508, CDS 510, and SHA 512 are powered off.

Figure 6:
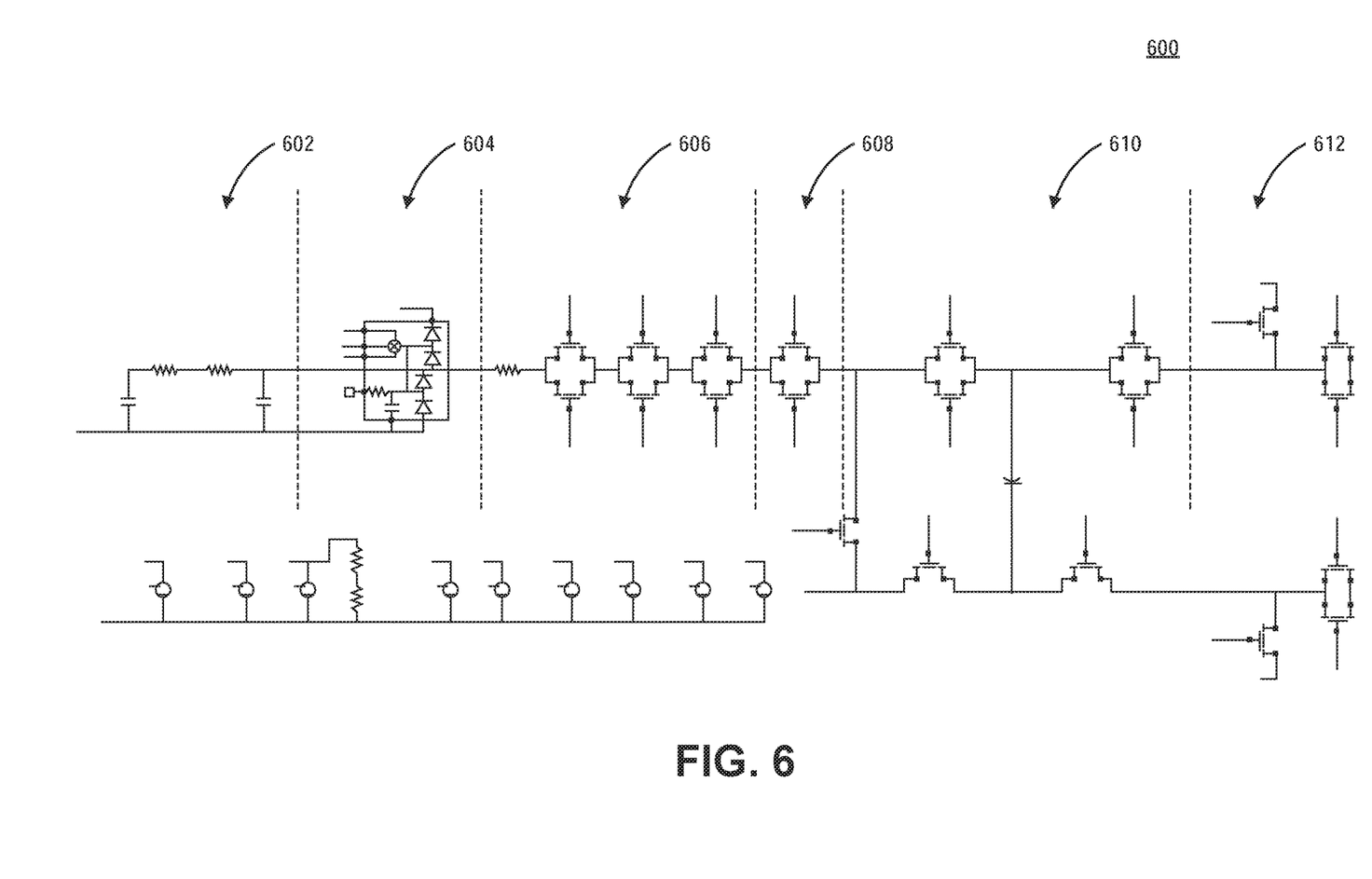
FIG. 6 is a detailed diagram illustrating an x-ray sensing signal path, according to some embodiments of the disclosure.

FIG. 6 is a detailed diagram illustrating the circuit elements in the x-ray sensing signal path 500, according to some embodiments of the disclosure. The system illustrated in FIG. 6 simplifies the Automatic Exposure Detection (AED) function. In particular, no additional components beyond what is used in the imaging mode are added for AED, or x-ray sensing, mode. Not adding additional components saves space and lowers system costs. The system illustrated in FIG. 6 includes an x-ray sensing panel 602. In some examples, the x-ray sensing panel 602 has about 1,000 pixels enabled per line. The system illustrated in FIG. 6 further includes an ESD circuit 604, an integrator and reset switch 606, a low pass filter 608, a CDS 610, and a sample and hold circuit 612. In some examples the x-ray sensing panel 602 includes multiple gate drivers enabled in parallel. Using multiple gate drivers generate a larger signal than using a single gate driver. Additionally, enabling the whole x-ray sensing panel 602 averages the signal across the x-ray sensing panel. In one example, the x-ray sensing panel 602 operates near 2.5 Volts in x-ray sensing mode. The system shown in FIG. 6 lowers ROIC power in x-ray sensing mode by about 98% as compared to previous systems, by using the ESD circuit 604 for x-ray sensing while powering down the higher power components, including the integrator and reset switch 606, the low pass filter 608, the CDS 610, and the sample and hold circuit 612.

Figure 7:
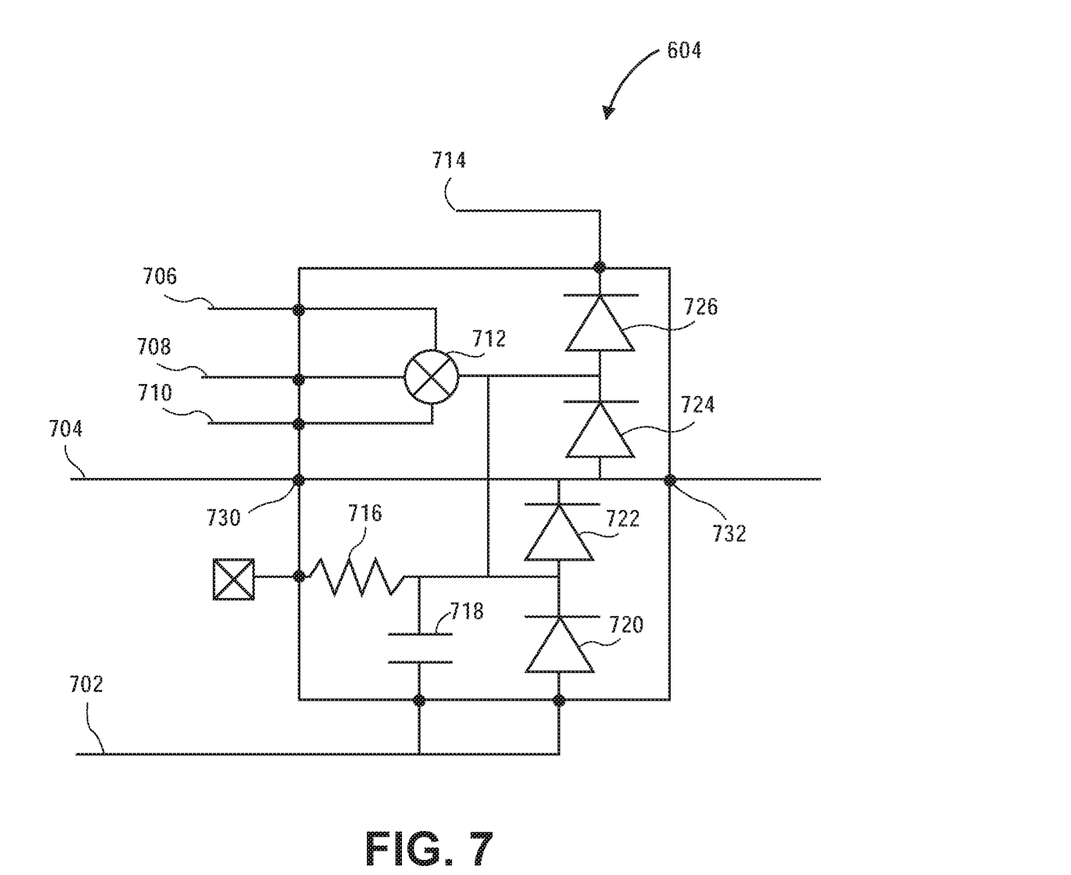
FIG. 7 is an enlarged view of a sense circuit, according to some embodiments of the disclosure.

FIG. 7 is an enlarged view of the ESD circuit 604, according to some embodiments of the disclosure. The ESD circuit 604 receives first 702 and second 704 inputs from the x-ray sensing panel 602 shown in FIG. 6. Additionally, the ESD circuit 604 has a first VDD input 706, a test input 708, a ground 710, and a second VDD input 714. The first VDD input 706, a test input 708, a ground 710, and a second VDD input 714 are input to a summer 712. The ESD circuit 604 also includes a capacitor 718 connected to the first 702 and second 704 inputs from the panel 602. The ESD circuit 604 also includes a resistor 716, connected to the first 702 and second 704 inputs and the capacitor 718. The ESD circuit 604 include first 720, second 722 third 724, and fourth 726 PN diodes connected in series. The first 720, second 722, third 724, and fourth 726 diodes are also connected to the inputs as shown in FIG. 7. The capacitor 718 and the resistors 716 are connected between the first 720 and second 722 diodes. The output from the summer 712 is connected between the third 724 and fourth 726 diodes. The ESD circuit 604 includes input node 730 and output node 732.

Since the integrators 606 (shown in FIG. 6) are powered down in x-ray sensing mode, the drive for the panel 602 comes from the ESD circuit 604.

The ESD circuit 604 is used for sensing x-ray signals. The test input is used to bias the first 720, second 722, third 724, and fourth 726 diodes to 2.5V. Biasing the first 720, second 722, third 724, and fourth 726 diodes to 2.5V clamps the line voltage to 2.5V+/-$V_{BE}$ depending on leakages. In some implementations, the 2.5V is generated with an internal resistor divider. In other implementations, the VT can be used for the input. In various implementations, the voltage +/-$V_{BE}$ is 100-200 mV inside ADC span. When a charge is put in the ESD circuit, the voltage across the diode changes. A converter senses the change in the voltage.

According to various examples, the systems and methods for x-ray sensing are highly configurable and can be optimized for various applications. In some implementations, the x-ray sensing system can be used for full panel sensing. In other implementations, the x-ray sensing system is applied to a limited area of an x-ray panel, with other portions of the x-ray panel powered down, resulting in even greater power savings. The systems and methods described herein provide fast sensing at any x-ray dose level, providing maximum time to minimize startup settling and image artifacts.

According to various implementations, the panel shown in FIGS. 5 and 6 includes multiple gate drivers enabled in parallel. Enabling the entire panel results in averaging of the signal across the panel. In some implementations, multiple gate drivers may be needed to generate a large enough signal for detection. In some examples, the number of gate drivers needed for signal detection depends on the strength of the x-ray. In one implementation, the panel operates near 2.5V for x-ray sensing mode.

According to various implementations, the integrators as shown in FIGS. 5 and 6 are powered down during the x-ray sensing mode and the integrator reset switch is closed. Thus, the input directly drives the CDS capacitor. In some implementations, one CDS capacitor is used to sample the line voltage. In various examples, the full CDS differentiation is not used. According to some implementations, a single ended ADC conversion is forced with logic changes.

According to various implementations, the SHA and ADC operate typically, and are configured for the power scaling mode. The reference buffers for the ADC and REF_DAC remain powered-on in a keep-alive state to minimize power, yet keep the heavily filtered nodes properly biased. In some implementations, a low power ADC reference buffer is used during conversions.

In some implementations a CMOS I/O is used in the x-ray sensing system for optimal power savings. In one example, one x-ray panel is used for the AED and the other x-ray panels are powered down.

Figure 8:
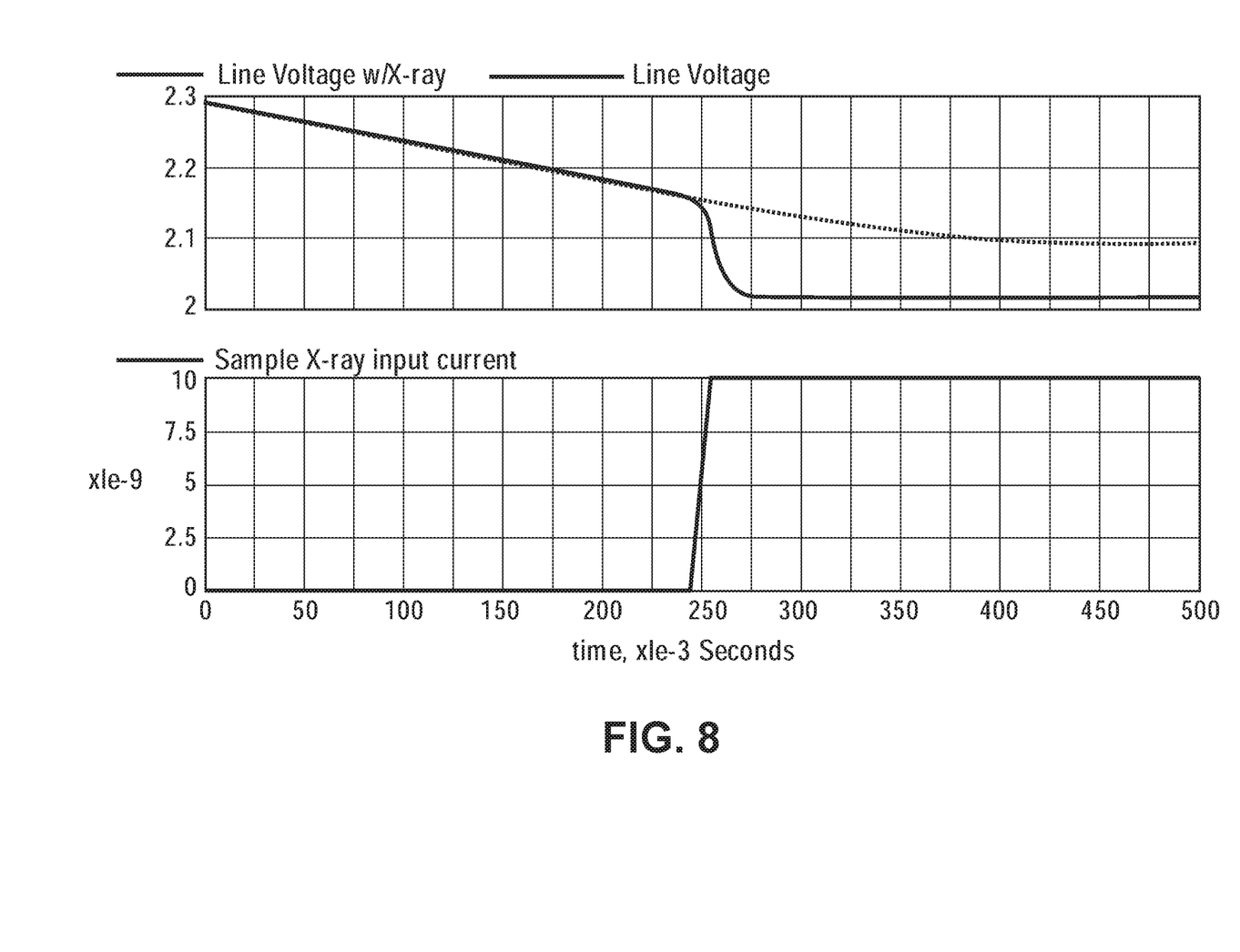
FIG. 8 is a graph illustrating results of a simulation of an x-ray sensing signal path, according to some embodiments of the disclosure.

FIG. 8 is a graph illustrating results of a simulation of an x-ray sensing signal path, according to some embodiments of the disclosure. As shown in the top graph, the input will drift toward 1 Vbe as a function of leakage and charge injection from the CDS capacitor. As shown in the bottom graph, line voltage may be unstable over time. An algorithm can be used to monitor the output data and determine a valid x-ray signal.

Figure 9:
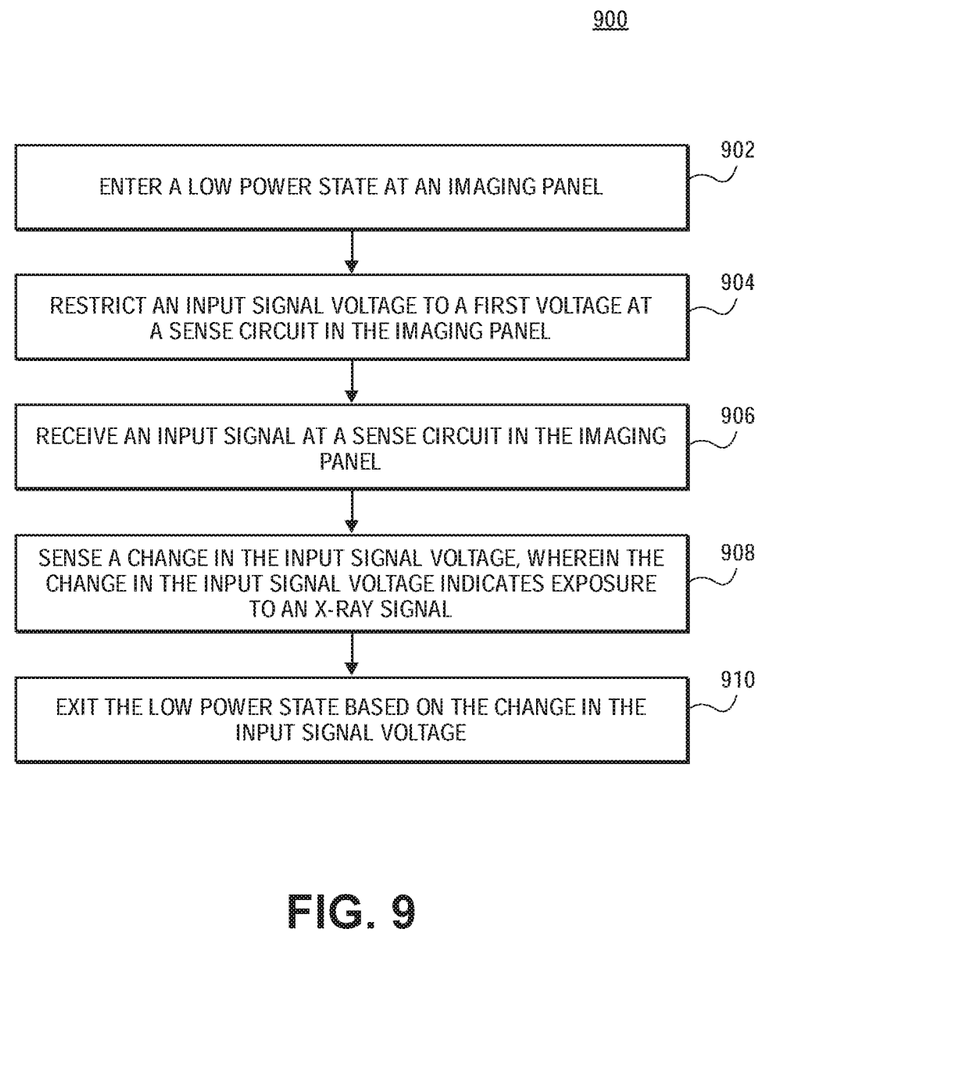
FIG. 9 is a flow chart illustrating a method for automatic exposure detection in imaging applications, according to some embodiments of the disclosure.

FIG. 9 is a flow chart illustrating a method 900 for automatic exposure detection in imaging applications, according to some embodiments of the disclosure. The method 900 includes, at step 902, entering a low power state at an imaging panel. Once the imaging panel is in a low power state, at step 904, an input signal voltage is restricted to a first voltage at a sense circuit in the imaging panel. In some examples, the input signal voltage is restricted by clamping the voltage. In some examples, restricting the input signal voltage comprises clamping the input signal voltage. In some examples, restricting the input signal voltage comprises clamping the input signal voltage at a diode. In other examples, clamping the input signal voltage comprises clamping the input signal voltage at a charge amplifier. In one example, the charge amplifier is optimized for x-ray sensing.

At step 906, an input signal is received at the sense circuit in the imaging panel. In various examples, the input signal is an x-ray signal. At step 908, a change in the input signal voltage is sensed, wherein the change in the input signal voltage indicates exposure to an x-ray signal. In some examples, the change in the input signal voltage is sensed using a converter. At step 910, the imaging panel exits the low power state based on the change in the input signal voltage. In some examples, when the imaging panel exits the low power state, it enters an imaging mode.

In some implementations, the imaging panel includes a readout integrated circuit (ROIC) having a signal chain, and entering the low power state includes reusing at least a part of the signal chain for the sense circuit. In some examples, the ROIC includes an integrator, and entering the low power state comprises powering down the integrator.

According to various implementations, the systems and methods discussed herein can be used for imaging applications, such as x-rays and CT scans.

In various implementations, the automatic detection exposure systems and methods discussed herein can be integrated into a digital x-ray analog front end. In one example, a digital analog front end has 256-channel and 16-bits, and integrates the charge-to-digital conversion signal chain on a single chip. A digital x-ray analog front end enables a wide range of digital X-ray modalities, including portable radiology and mammography as well as high speed fluoroscopy and cardiac imaging. A digital x-ray analog front end can be delivered on a high density system-on-flex (SOF) package that can be directly mounted on a digital X-ray panel. In some examples, converted channel results are output on a single LVDS self-clocked serial interface, significantly reducing external hardware. A Serial Peripheral Interface (SPI)-compatible serial interface allows configuration of the digital x-ray analog front end, using serial digital interface input. Serial data output allows several digital x-ray analog front end to be daisy-chained on a single 3-wire bus. In some examples, an integrated digital x-ray analog front end timing sequencer controls the sampling activity of the digital x-ray analog front end. The sequencer is programmed via the SPI port and is timed by a single clock.

Variations and Implementations

In the discussions of the embodiments above, the capacitors, clocks, DFFs, dividers, inductors, resistors, amplifiers, integrators, switches, digital core, transistors, and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the FIGURES may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the clocking and filtering functionalities may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that the activities discussed above with reference to the FIGURES are applicable to any integrated circuits that involve signal processing, particularly those that use sampled analog, some of which may be associated with processing real-time data. Certain embodiments can relate to multi-DSP signal processing, floating point processing, signal/control processing, fixed-function processing, microcontroller applications, etc.

In certain contexts, the features discussed herein can be applicable to medical systems, scientific instrumentation, wireless and wired communications, radar, industrial process control, audio and video equipment, current sensing, instrumentation (which can be highly precise), and other digital-processing-based systems.

Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind). Furthermore, powertrain systems (for example, in hybrid and electric vehicles) can use high-precision data conversion products in battery monitoring, control systems, reporting controls, maintenance activities, etc.

In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions. Yet other consumer applications can involve advanced touch screen controllers (e.g., for any type of portable media device). Hence, such technologies could readily part of smartphones, tablets, security systems, PCs, gaming technologies, virtual reality, simulation training, etc.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that some of the operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes, Examples, and Implementations

Note that all optional features of the apparatus described above may also be implemented with respect to the method or process described herein and specifics in the examples may be used anywhere in one or more embodiments.

In a first example, a system is provided (that can include any suitable circuitry, dividers, capacitors, resistors, inductors, ADCs, DFFs, logic gates, software, hardware, links, etc.) that can be part of any type of computer, which can further include a circuit board coupled to a plurality of electronic components. The system can include means for clocking data from the digital core onto a first data output of a macro using a first clock, the first clock being a macro clock; means for clocking the data from the first data output of the macro into the physical interface using a second clock, the second clock being a physical interface clock; means for clocking a first reset signal from the digital core onto a reset output of the macro using the macro clock, the first reset signal output used as a second reset signal; means for sampling the second reset signal using a third clock, which provides a clock rate greater than the rate of the second clock, to generate a sampled reset signal; and means for resetting the second clock to a predetermined state in the physical interface in response to a transition of the sampled reset signal.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method for automatic exposure detection in imaging applications comprises:
   entering a low power state at an imaging panel;
   restricting an input signal voltage to a first voltage at a sense circuit in the imaging panel, wherein restricting the input signal voltage comprises clamping the input signal voltage at one of a diode and a charge amplifier;
   receiving an input signal at the sense circuit in the imaging panel;
   sensing a change in the input signal voltage, wherein the change in the input signal voltage indicates exposure to an x-ray signal; and
   exiting the low power state based on the change in the input signal voltage.

2. The method of claim 1, wherein clamping the input signal voltage at a diode comprises clamping the input signal voltage at a plurality of diodes.

3. The method of claim 1, wherein the imaging panel includes a readout integrated circuit (ROIC) having a signal chain, and wherein entering the low power state includes reusing at least a part of the signal chain for the sense circuit.

4. The method of claim 3, wherein the ROIC includes an integrator, and wherein entering the low power state comprises powering down the integrator.

5. The method of claim 3, wherein reusing at least a part of the signal chain includes reusing a clamp element of the signal chain, and wherein entering the low power state includes powering down other elements of the signal chain.

6. The method of claim 1, wherein sensing a change in the input signal voltage includes sensing a change using a converter.

7. A system for automatic exposure detection in imaging applications comprises:
   an imaging panel including a low power mode;
   a sense circuit for restricting an input signal voltage to a first voltage and receiving an input signal in the low power mode, wherein the sense circuit includes at least one of a diode and a charge amplifier for clamping the input signal voltage; and
   a sensor for sensing a change in the input signal voltage at the at least one of the diode and the charge amplifier, wherein the change in input signal voltage indicates exposure to an x-ray signal.

8. The system of claim 7, wherein the diode for clamping the input signal voltage comprises a plurality of diodes connected in series.

9. The system of claim 7, further comprising a readout integrated circuit (ROIC) having a signal path, wherein in the low power mode, the sense circuit uses at least a part of the signal path.

10. The system of claim 9, wherein the ROIC includes an integrator, and wherein the integrator is powered down in the low power mode.

11. The system of claim 9, wherein the part of the signal path the sense circuit uses includes a clamp.

12. The system of claim 7, wherein the sensor is a converter.

13. The system of claim 7, wherein the sense circuit is an electrostatic discharge circuit.

14. A system for automatic exposure detection in imaging applications comprises:
   an imaging panel including a low power mode;

a sense circuit for restricting an input signal voltage to a first voltage and for receiving an input signal in the low power mode; wherein the sense circuit including a means for clamping the input signal voltage; and means for sensing a change in the input signal voltage, wherein the change in input signal voltage indicates exposure to an x-ray signal.

15. The system of claim 14, wherein the means for sensing includes a converter.

16. The system of claim 14, wherein the sense circuit is an electrostatic discharge circuit.

17. The system of claim 14, wherein the means for clamping the input signal voltage includes a diode.

18. The system of claim 14, wherein the means for clamping the input signal voltage includes a charge amplifier.

* * * * *